Fig. 1

United States Patent Office 2,760,769
Patented Aug. 28, 1956

2,760,769

METHOD AND APPARATUS FOR AUTOMATICALLY CONTROLLING CERTAIN OPERATIONS IN A PRODUCTION PLANT BY SENSING BY ELECTRO-MAGNETIC INDUCTION THE DENSITY, VELOCITY AND RATE OF FLOW OF FLOWING MAGNETIC MATERIAL

Nordahl I. Onstad, Minneapolis, Minn.

Application August 22, 1952, Serial No. 305,843

14 Claims. (Cl. 266—1)

This invention relates to a method and apparatus for automatically controlling certain operations in a production plant by sensing by electro-magnetic induction the density, velocity and mass rate of flow of flowing magnetic material.

For purposes of this application, density is herein defined as meaning the average weight per unit length of magnetic material moving from one location to another, and mass rate of flow as used herein is defined as meaning the average weight of magnetic material moving per unit of time, and magnetic material is herein defined as meaning only that portion of the flowing material which is ferro-magnetic, thus capable of being magnetized.

For many years, it has been a difficult problem to provide accurate control of operations which depend upon certain properties of moving material because of limitations in presently known sensing devices. In this application, we are concerned with moving material in which at least a portion thereof is ferro-magnetic. This problem has become particularly acute with the operation of taconite ore concentrating plants, such as the plant diagrammatically illustrated in Fig. 1 of the drawing hereof. In the operation of such concentrating plants, the accurate control of material flow is absolutely necessary for satisfactory functioning of certain specific plant operations, such as the accurate control of the rate at which magnetic iron is initially introduced into the plant and also the control of the proportions of coal and iron ore which are fed into a furnace. It should be noted that the plant diagrammatically disclosed herein is designed for use to concentrate magnetic taconite which consists in relatively low grade magnetic ore usually of approximately 22 to 28% iron content. Large deposits of such low grade magnetic ore are found in a number of areas in the eastern part of northern Minnesota and other portions of the United States and several pilot plants for concentrating this type of ore have been set up. It is for the control of certain operations within such plants that my invention is primarily intended. Several different types of control apparatus have been tried, such as venturi flow measuring devices and weightometer control devices, but none of these has produced the required accuracy and range of control necessary for efficient operation of the plant.

It is therefore an object of my invention to provide a method and apparatus primarily intended for use in low grade iron ore concentrating plants for controlling certain operations carried on in such plants whereby, by electro-magnetic induction, the density, velocity and rate of flow of magnetic material is accurately measured and an indicating signal produced which is adapted for use in such controlling function.

It is another object of my invention to provide a method and apparatus for measuring the density of flowing magnetic material by electro-magnetic induction to produce a voltage proportional to said density, which voltage is used for controlling the speed of operation of certain material feeding apparatus of a plant to automatically vary the relationship of the material carried by said feeding apparatus to other operative elements of the plant.

It is still another object to provide a novel and highly ingenious method and apparatus for measuring the velocity of magnetic material by electro-magnetic induction to produce a velocity indicating signal capable of being used for control purposes particularly in a magnetic ore concentrating plant.

It is a further object to provide novel and highly efficient electronic apparatus for combining an induced density voltage with an induced velocity voltage to produce a signal indicating the rate of flow of magnetic material.

More specifically, it is an object to provide apparatus having a pair of electro-magnetic induction systems, one adapted to produce a density indicating signal and the other adapted to produce a velocity of flow indicating signal, said apparatus including electronic equipment interconnecting said two systems for combining the two signals and producing a rate of flow indicating signal adapted to be used for control purposes.

Still more specifically, it is an object to produce apparatus having a pair of electro-magnetic induction systems, one adapted to produce a signal indicating the density of magnetic material moving along a flow line and the other indicating the velocity of said material, the density indicating system being constructed to measure a voltage induced by the presence of magnetic material within a magnetic field, which induced voltage is directly proportional to the density of said magnetic material and said velocity indicating system being constructed to produce a pulsating voltage, the frequency of said pulses being directly proportional to the velocity of the magnetic material and said apparatus combining said pulsating voltage with said density indicating voltage and smoothing out the signal produced thereby to produce a substantially smooth signal indicating the mass rate of flow, said signal being adapted to be used for control purposes.

It is another specific object to provide a system for indicating the velocity of magnetic material moving along a flow line and including means for producing an instantaneous pulse of current which magnetizes an extremely short increment of the magnetic material in said flow line, which increment induces a voltage in a detecting coil disposed in spaced relation to said means, which induced voltage is amplified and connected with the grid of a thyratron tube to control the firing of said tube, which firing produces another instantaneous pulse of magnetizing current to produce another increment of magnetized material in said flow line, the frequency of said pulses being directly proportional to the velocity of the magnetic material moving in said flow line.

It is still a further object to provide a pulse producing mechanism for use with a velocity measuring system of the class described for initially firing the thyratron tube of said system to produce the initial magnetizing pulse which imposes the initial magnetized increment on said flow line of magnetic material.

These and other objects and advantages of my invention will more fully appear from the following description made in connection with the accompanying drawings wherein like reference characters refer to the same or similar parts throughout the several views and in which.

Figure 1:
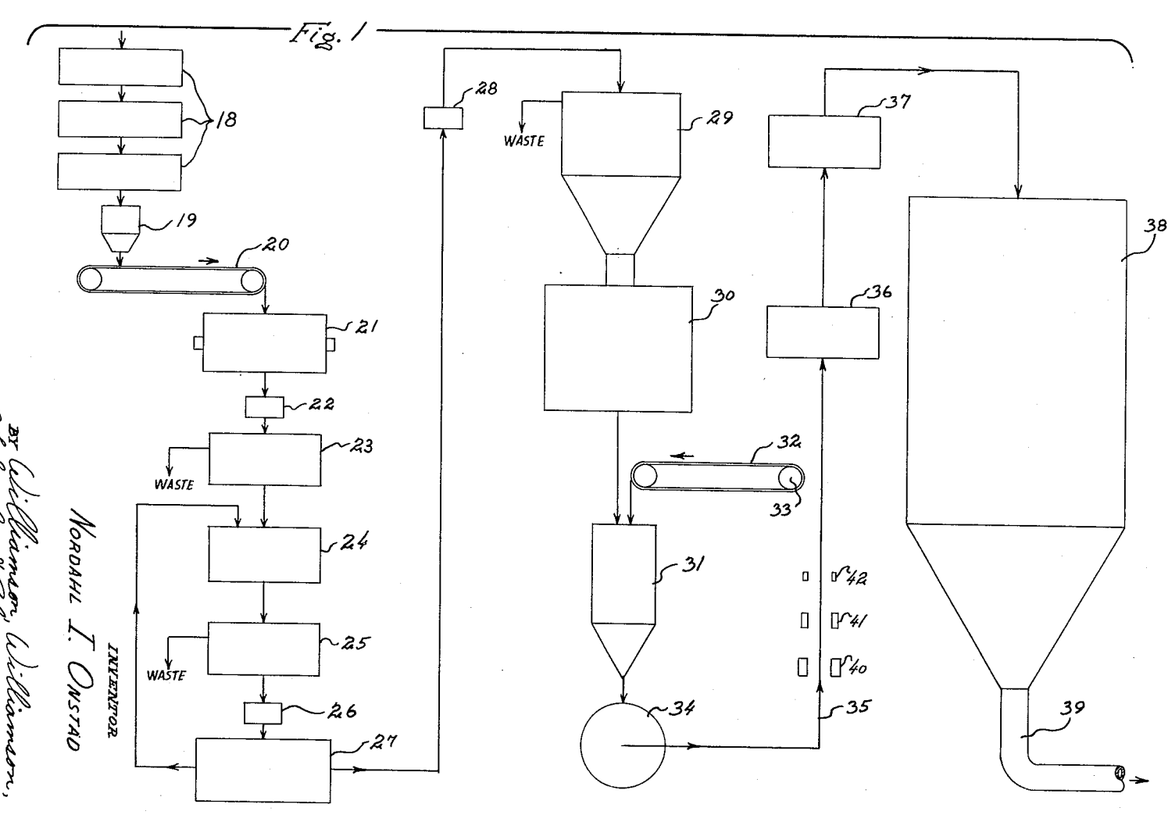
Fig. 1 is a diagrammatic view of a typical taconite ore concentrating and agglomerating plant indicating the flow of material therethrough.

Fig. 1 illustrates a typical arrangement of an iron ore concentrating plant in which the low grade taconite ore rock to be concentrated is initially crushed by the plurality of rock crushers 18 successively receiving the flow of rock therethrough. From the rock crushers 18, the ore is delivered to a storage bin 19 which discharges onto a conveyor belt 20 designed to maintain a substantially constant depth of flow of material thereon so that the total weight of material carried thereby is proportional to the speed at which the conveyor is traveling. This conveyor delivers the material to a rod mill 21 where considerable water is added thereto. The rod mill 21 further reduces the size of the ore pieces and delivers the relatively finely divided ore to a magnetizer 22 which agglomerates the magnetic material therein. From the first magnetizer 22, the ore pulp is carried to a mechanical classifier 23 having suitable raking and agitating means from which the light weight non-magnetic material is overflowed as tailings and the rake product therefrom is carried into a ball mill 24 to further reduce the size of particles therein. From the ball mill 24, a magnetic separator 25 removes the magnetic material from the non-magnetic tailings, which tailings are discharged as waste and the magnetic material which has water added thereto is then de-magnetized by the de-magnetizer 26 and passes into a second mechanical classifier 27 from which the overflow or concentrate is carried to a magnetizer 28 and from which classifier 27 the rake product is returned to the ball mill 24 to be further pulverized. From the magnetizer 28, the agglomerated magnetic material may be passed to a hydro classifier 29 from which the light weight non-magnetic material is overflowed as tailings or slimes and the concentrate or heavier material is delivered to magnetic separation finishers 30. From the finishers 30, the pulp is carried to a sump 31 at which point coal in a finely divided state may be added as by a conveyor 32 driven by a variable speed D. C. motor 33. A pump 34 takes the pulp with coal added thereto from the bottom of the sump 31 and delivers the same through a non-magnetic tube 35 to water removing filters 36, from which all but approximately 10% of the water is removed. The 90% solid material is then transferred to ball drums 37 which roll the intermixed ore and coal into balls and these damp balls are then delivered into a furnace such as the shaft furnace 38 or a moving grate furnace (not shown in which the same are heated and hardened and the agglomerated masses thus produced being highly stable are delivered from the bottom of furnace 38 through suitable conveyor means 39.

In the form of my invention illustrated, two separate operations of the concentrating plant shown are controlled by my apparatus. One of these operations is diagrammatically illustrated in Figs. 2 and 6 of the drawings and designated as an entirety by the letter F. The other of these controlled operations is diagrammatically illustrated in Figs. 4, 5 and 7 and is designated as an entirety by the letter G.

Figures 2, 4, 7:
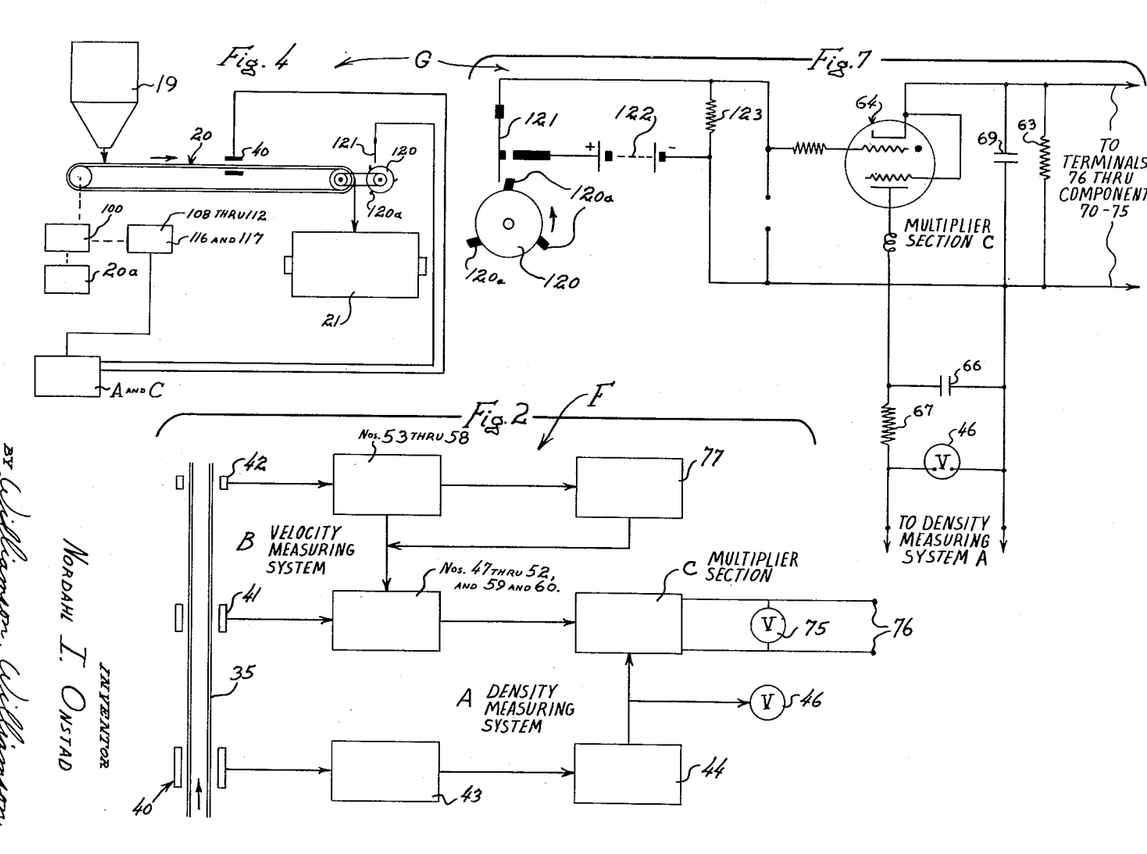
Fig. 2 is a diagrammatic view of my measuring apparatus as applied to one type of material conveyor.
Fig. 4 is a diagrammatic view showing a typical feed control system for maintaining a constant weight of magnetic material delivered to the plant rod mill.
Fig. 7 is a diagrammatic view of the velocity measuring portion of control system G.

As best shown in the diagrammatic view in Fig. 2, I provide a rate of flow measuring system which is divided into three interconnected sections or systems, one having the density measuring system A, another being velocity measuring system B, and the third being the multiplier section or system C for combining the density signal produced by system A with the velocity signal produced by system B. In addition to the three systems A, B and C, a pulse initiating circuit 77 may be provided to produce the initial pulse for the velocity measuring system B.

Density measuring system A

Figure 3:
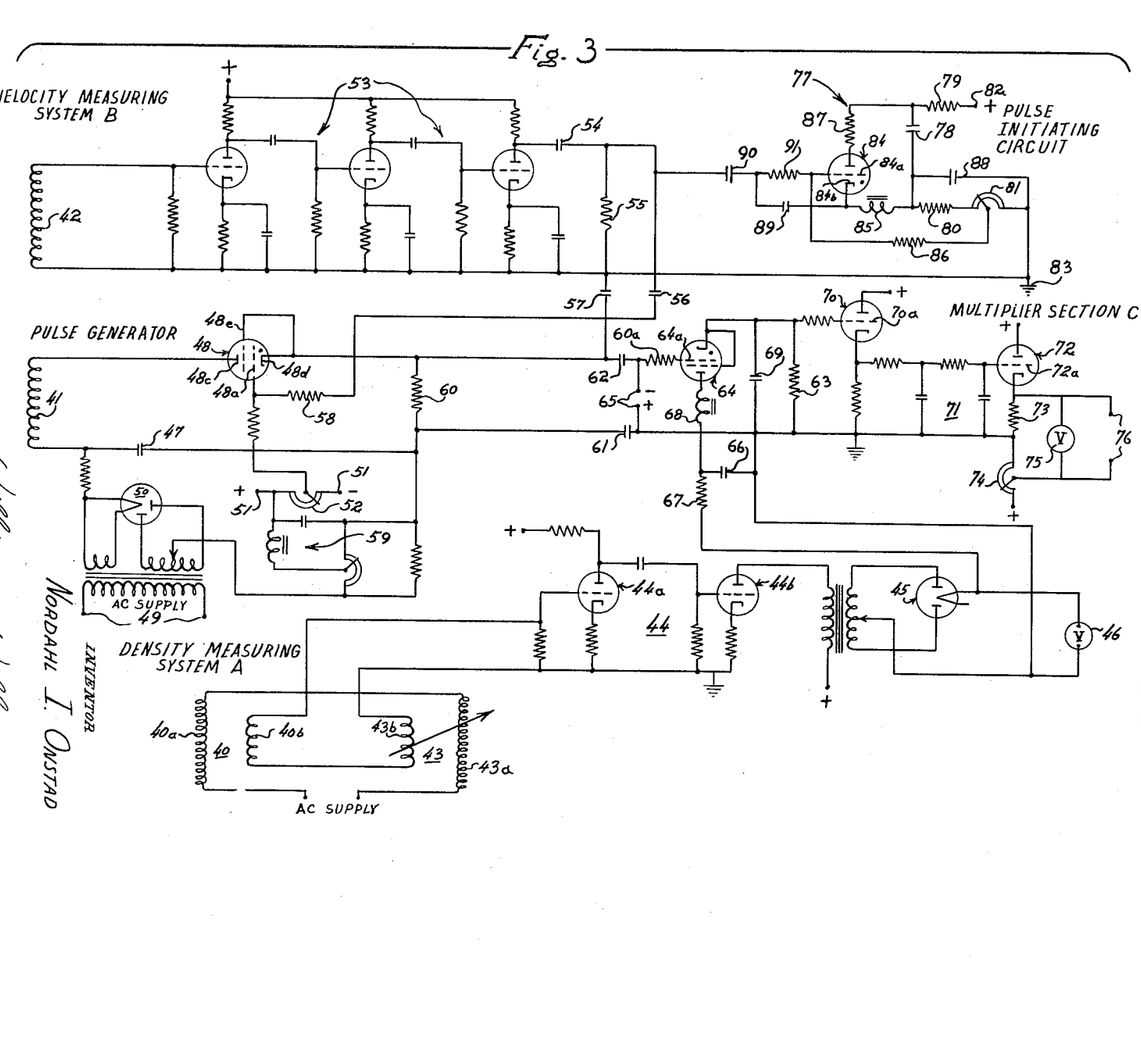
Fig. 3 is a wiring diagram of my measuring apparatus showing typical circuitry therefor.

The density measuring system A has an inductance coil system 40 consisting, in the form shown, in a pair of fixed mutual inductance coils, primary 40a and secondary 40b, best shown in Fig. 3, and mounted in close association to the magnetic material, such as by being positioned around a portion of the tube 35. In the form shown, a balancing voltage system 43 is provided, which system consists in a pair of mutual inductance coils 43a and 43b mounted away from the tube 35, the degree of coupling between said coils being capable of adjustment. The primary coils 40a and 43a are connected in series and energized with a periodically changing current of constant amplitude such as from a conventional 60 cycle A. C. supply. The secondary coils 40b and 43b are connected in series opposition. With no magnetic material present in the magnetic field of coil system 40, the mutual coupling of coil system 43 is so adjusted that the voltage induced in coil 43b is equal and opposite to the voltage induced in 40b, and therefore the two voltages balance out each other. When magnetic material is present in the magnetic field of coil system 40, the magnetic coupling between coils 40a and 40b will be increased, thus increasing the voltage induced in coil 40b. This additional induced voltage in coil 40b produced by the presence of magnetic material in the tube 35 around which coil system 40 is mounted produces an output signal which is amplified by a conventional amplifying system 44 having vacuum tubes 44a and 44b, and said signal is subsequently rectified by the rectifier tube 45, best shown in Fig. 3. By proper design of the coil system 40, this additional voltage induced by the presence of magnetic material will be directly proportional to the density of the magnetic material flowing in said tube 35. The amplified and rectified density measurement signal thus produced can of course be used for controlling purposes and may also have an indicating meter such as the voltmeter 46 connected therewith and calibrated to read the density of the magnetic material directly thereon and, in the event that the velocity of flow is precisely constant, the meter 46 may be calibrated to read the mass rate of flow of the magnetic material.

Velocity measuring system B

However, where the velocity at which the material is being conveyed varies, it is necessary to provide a velocity measuring system to determine the rate of flow of the material. Such a system B, having a magnetizing pulse producing coil 41 and a magnetic pulse detecting coil 42, is designed for use with a material conveying tube such as the material conveying non-magnetic tube 35. The coils 41 and 42 are positioned in close association to the tube 35 as by surrounding said tube in predetermined spaced-apart relation, the detecting coil 42 being positioned in the direction of flow away from the magnetizing coil 41. The signal induced in detecting coil 42 is then amplified and fed back to actuate a pulse generator so that the frequency of the pulses is, in the form shown, directly proportional to the velocity of the magnetic material flowing in the tube 35. It is also important to note that the concentration of ferromagnetic material in the flowing ore pulp traveling through the plant is extremely low. Therefore, in order to magnetize this material, a magnetic field of relatively high uniform intensity is required and this, of course, is one of the problems which I have overcome in my velocity measuring system by circumferentially surrounding the pulp-conveying conduit or pipe 35 with circular coils. These coils 41 and 42 are designed particularly to produce a high intensity magnetic field which is substantially uniform throughout the entire cross-sectional area of the tube 35.

The pulse generator

The pulse generator circuit has a condenser 47 connected in series with magnetizing coil 41; said condenser 47 and magnetizing coil alone producing a normally oscillating circuit which has a thyratron tube 48 connected in series therewith to allow only one-half cycle of current to flow in said circuit through coil 41. The condenser 47 is charged by any suitable means, such as the A. C. supply from lines 49 rectified by the conventional rectifier tube 50. The control grid 48a of thyratron tube 48 has a negative bias normally maintained thereon by any suitable means, such as the source of D. C. voltage supplied to lines 51, said bias voltage being adjustable by the potentiometer 52. A plate 48c is connected with one terminal of coil 41 and cathode 48d is connected through a small resistance 60 with the capacitor 47 which is connected with the other terminal of the coil 41. A shield grid 48e is provided in the tube 48 in the form of the invention illustrated. A conventional three-stage amplifier circuit is designated as an entirety by the numeral 53 and has a conventional differentiating circuit with condenser 54 and resistance 55 connected therewith. The signal thus amplified and differentiated is fed through condensers 56 and 57 and resistance 58 to impress the same between the grid 48a and cathode 48d of tube 48 and thus renders said grid 48a sufficiently less negative with respect to the cathode 48d to permit said tube to fire, allowing one-half cycle of current to flow, and thus produce a uni-directional pulse of current through magnetizing coil 41. An adjustable automatic grid bias control circuit 59 provides an additional bias for grid 48a during the charging of the condenser 47 and maintains said tube in a non-conducting condition during this charging period.

The multiplier section or system C

In the form of my invention illustrated, the pulsing circuit of tube 48 has a small resistance 60 connected in series therewith and the voltage drop across said resistance 60 whenever the tube 48 fires is fed through condensers 61 and 62 and resistance 60a to vary the voltage on the grid 64a of a second thyratron tube 64. The grid 64a is normally biased by any suitable source of direct current voltage such as the supply line 65. The pulsating direct current signal from the density measuring system is used to charge a condenser 66 through resistance 67 and said condenser 66 partially discharges through inductance 68 and thyratron tube 64 when said tube is rendered conductive by the pulse of current through tube 48 and resistance 60 to charge condenser 69. Said condenser 69 discharges through resistance 63 between the pulses from tube 48 across resistance 60 and the resulting voltage across resistance 63 is impressed upon the grid 70a of a cathode follower tube 70. The cathode follower tube 70 provides a high impedence load for the output of condenser 69 and resistance 63 which are connected in parallel. The output of the cathode follower tube 70 is filtered through a filter network indicated at 71 which serves to smooth out the voltage and produce a substantially non-fluctuating D. C. voltage. This signal is fed to the grid 72a of a second cathode follower tube 72 which also provides a high impedance load on filter 71. The cathode follower tubes 70 and 72 serve as impedance matching devices in a well-known manner, matching high impedance input with low impedance load. The output voltage of the cathode follower tube 72 produced by the current flowing through resistance 73 is connected in series opposition with an adjustable source of nulling D. C. voltage from potentiometer 74. This adjustable nulling D. C. voltage serves to balance out the voltage developed across resistance 73 when no material is flowing through the tube 35 and no pulses are being produced by the pulse generator and no voltage is produced across resistance 63. Therefore, the net voltage produced across terminals 76 is directly proportional to the mass rate of flow of magnetic material through conveyor tube 35 and is adapted for control purposes as will hereinafter be described, and a rate meter such as the D. C. voltmeter 75 may be calibrated to read directly the mass rate of said flow of the magnetic material.

Pulse initiating circuit

Any suitable means for producing an initial pulse in magnetizing coil 41 may be provided, such as the relaxation oscillator circuit, designated as an entirety by the numeral 77 and best shown in Fig. 3. A condenser 78 is initially charged through resistance 79, 80 and potentiometer 81 as from a suitable source of direct current voltage supplied from line 82 to ground 83. The voltage drop across resistance 80, plus the drop across the adjusted portion of potentiometer 81 is applied between the cathode 84b and control grid 84a of a thyraton tube 84 respectively through inductance 85 and resistance 86 so that the grid 84a is negative with respect to the cathode. As the condenser 78 becomes charged, the charging current will, of course, decrease to a low value reducing the negative differential between the control grid 84a and the cathode 84b sufficiently to render said tube 84 conductive, whereupon the charge on condenser 78 flows through the circuit consisting in a resistance 87, tube 84 and the inductance 85. When said tube 84 fires, the voltage appearing across the inductance 85 is fed through condensers 88, 89, 90, 56 and 57 and through resistance 58 and thus is impressed from control grid 48a to cathode 48d of thyratron tube 48 to cause said tube 48 to fire and produce an initial magnetizing pulse through the inductance coil 41, assuming of course that condenser 47 has been previously charged by the source of direct current 49 and 50.

The amplified and differentiated voltage picked up by detecting coil 42 is impressed across the grid 84a and cathode 84b, to grid 84a through condenser 90 and resistance 91 and to the cathode through potentiometer 81, resistance 80 and inductance 85, and is sufficient to cause tube 84 to fire irrespective of the proportional charge on condenser 78, and after the initial pulse has been produced by oscillator circuit 77, said circuit, including tube 84, fires simultaneously with the occurrence of each detected pulse picked up by coil 42 which controls the firing of tube 48 and the firing of tube 84 will thereafter have no effect on the control of the firing of the tube 48 as long as material is flowing in tube 35. It should be noted that, if for any reason during operation the pulse generator tube 48 is not fired by the detected pulse fed back through amplifier 53, the pulse initiating circuit, including tube 84, will automatically supply another initiating pulse to the pulse generator to cause tube 48 to fire and magnetize an increment of the flowing magnetic material which will be picked up by coil 42 and fed back in the manner described, thus automatically renewing the operation of the pulse generator without manual attention.

Figure 6:
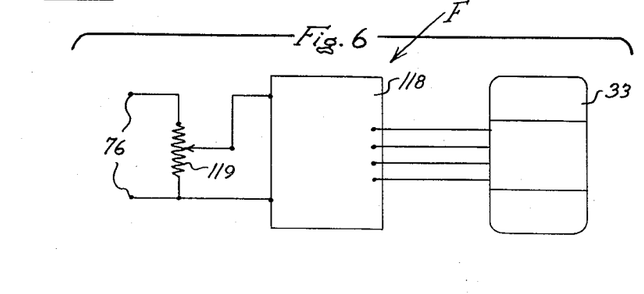
Fig. 6 is a diagrammatic view of another feed control system to automatically maintain constant predetermined proportions between the flowing magnetic material and additives thereto.

In control system F, the mass rate of flow control signal produced across terminals 76 is connected to the variable speed D. C. motor 33 which drives the coal delivery conveyor 32 and controls the rate of discharge of said conveyor in accordance with variations in said mass rate of flow signal at terminals 76. In order to obtain the desired control, a suitable unit such as a General Electric "Thymotrol" panel 118 is interposed between the terminals 76 and variable speed motor 33 to receive the signal voltage across terminals 76 through an adjustable potentiometer 119 and by varying the rate of discharge the delivery conveyor maintains a predetermined proportion of coal to magnetic material flowing through the tube 35.

The control system G, as best shown in Fig. 4, is designed to maintain a substantially constant weight of magnetic material flowing to the rod mill 21 and this result is obtained by controlling the rate of travel of the belt conveyor 20 which is designed to carry a uniform depth of crushed crude rock so that the speed of travel of said belt will be directly proportional to the rate of discharge therefrom into said rod mill. This of course means that, if the density of magnetic material carried by said conveyor 20 varies, the volume of total crushed rock ore material delivered to the rod mill will vary inversely with the density of the magnetic material in the ore and it is desired to maintain a substantially uniform weight of magnetic material delivered to the rod mill 21 to insure a substantially uniform weight of concentrated magnetic material discharged from the magnetic separator finishers 30 and the hydro classifier 29, but of course this will vary the volume of the various waste products discharged during the concentrating operation.

In said control system G, a similar density measuring system A as previously described is used with the coil system 40 associated with upper run of conveyor belt 20, but an electro-mechanical velocity-measuring system is provided such as the mechanism illustrated diagrammatically in Fig. 7. Since the control system G is dealing with the control of material adapted to be carried by the conveyor belt 20, it is a relatively simple matter to provide a velocity-measuring mechanism mechanically connected with said conveyor and for simplicity of description, a velocity measuring pulse-producing mechanism is illustrated which is connected into the multiplier section C in the same manner as the pulse-generating system previously described herein. In the electromechanical velocity-measuring system illustrated, a rotary actuator 120 having a direct driving connection with a portion of the conveyor is provided and, in the form shown, has a plurality of radially outstanding actuating elements 120a. A shiftable resilient contact member 121 is provided for intermittent engagement with said outstanding actuator elements 120a and, when the same snaps off of each actuator element, a single momentary pulse of current is produced in a circuit consisting of a suitable source of D. C. voltage 122 and the resistance 123. The pulsed voltage drop produced across said resistance 123 is connected from the grid to cathode of thyratron tube 64 and each such pulse fires said tube in the same manner as the pulse produced by the magnetic induction pulse generating system previously described and which combines with the density measuring voltage to produce a mass rate of flow indicating control voltage across the terminals 76.

Figure 5:
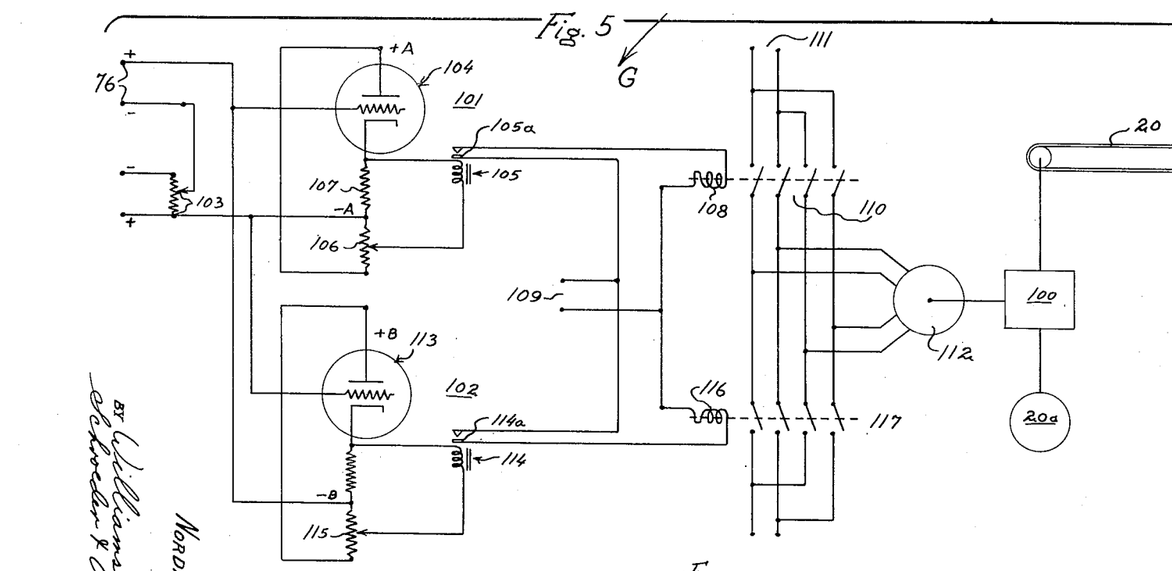
Fig. 5 is a wiring diagram of the system shown in Fig. 4.

The signal produced at the terminal points 76, by multiplying the density and velocity signals as has been described is fed into a plurality of electronic relay circuits such as the pair of circuits best shown in Fig. 5 and respectively designated by the numerals 101 and 102. In the form shown, the circuit 101 is designed to reduce the speed of travel of the conveyor belt 20 and the circuit 102 is designed to increase the speed of travel of said belt 20. In circuit 101 when the voltage across terminal points 76 becomes larger than the adjustable opposing reference voltage across points 103, the grid of tube 104 becomes more positive with respect to its cathode and causes current to flow in the sensitive relay 105 connected to the output of cathode follower tube 104. An opposing or nulling voltage is produced in the cathode circuit of tube 104 to prevent sufficient current from flowing through the coil of relay 105 to close said relay. This nulling circuit voltage is controlled by a potentiometer 106 and is adjusted to null out or balance a selected amount of the output voltage of tube 104 across resistance 107, when the voltage across points 76 is equal to the voltage across points 103. Thus, as long as the mass rate of flow of magnetic material carried by conveyor 20 remains below a predetermined limit, the contacts 105a of relay 105 remains open, but, as soon as the voltage between points 76 becomes sufficiently greater than the voltage between points 103, sufficient current will be permitted to flow through the coil of relay 105 to close 105a. This closes the circuit through a relay coil 108 through an independent external supply voltage 109.

The coil 108 closes the speed reduction relay contacts 110 which interconnect an independent external source of voltage 111 with a reversible pilot motor 112 which continuously shifts a conventional adjustable speed changing transmission 100 in a direction to progressively reduce the output speed therefrom as long as the speed reduction contacts 110 are closed. Any suitable power source for supplying input power to the transmission 100 may be provided such as the constant speed conveyor driving motor 20a. The transmission 100 is so constructed that the speed of conveyor belt 20 is continuously decreased until the mass rate of flow output voltage across points 76 is sufficiently reduced to permit relay 105 to drop out.

Referring now to circuit 102, if the voltage across points 76 becomes sufficiently less than the voltage across points 103, the grid of a second cathode follower tube 113 becomes more positive with respect to its cathode to render said tube 113 sufficiently more conductive to close another sensitive relay 114, the coil circuit of which has an adjustable nulling or balancing voltage sufficient to maintain said relay 114 open as long as the voltage across 76 is equal to the voltage across points 103 said nulling voltage being adjustable as by potentiometer 115. Whenever said voltage 76 drops below a predetermined value to indicate a decrease in the rate of flow of material on conveyor belt 20, the tube 113 will become sufficiently conductive to close the contact 114a of relay 114 and close the circuit from outside supply source 109 through a speed increasing relay coil 116 which closes the speed increasing relay contacts 117 and causes transmission actuating motor 112 to move the ratio control of transmission 100 in a direction to increase the output speed thereof with relation to the input speed from driving motor 20a. This progressive speed increase continues until the mass rate of flow output voltage across points 76 increases sufficiently to permit relay 114 to drop out.

The following is a description of the operation of my complete control system designated by the letter F. As has been previously stated herein, control system F is particularly adapted for use where magnetic material in pulp form is flowing through a confining tube such as the non-magnetic tube 35. It is extremely difficult to obtain accurate measurement of flow of such pulp material, especially when both the density and velocity thereof are variable. In control system F, both the density measuring signals and velocity measuring signals are produced by electro-magnetic induction by the respective measuring systems A and B and said two signals thus produced are electronically combined by the multiplier system C to produce a mass rate of flow indicating signal across terminals 76. It should be noted that the duration of each pulse through magnetizing coil 41 of velocity measuring system B is of such short duration that the flowing magnetic material moves only a negligible distance during each of said pulses. The increment thus magnetized passes from magnetizing coil 41 to the detection coil 42 and induces a voltage in said coil 42 which at each instant is proportioned to rate of change of magnetic flux linkages with coil 42 at the particular instant. The control voltage across terminals 76 is proportional to the mass rate of flow of the magnetic material in tube 35 and is connected to a selected material conveying mechanism such as the driving motor 33 of the coal feeding conveyor 32, and any suitable motor control unit such as the "Thymotrol" panel 118 serves to provide the actual speed control of said motor in response to the mass rate of flow indicating signal from terminals 76 through the potentiometer 119. Thus, by varying the rate of discharge of the coal delivery conveyor 32, a predetermined proportion of coal to magnetic material flowing through the tube 35 may be accurately maintained.

My method for measuring the weight per unit length of magnetic material, generally stated, consists in initially positioning material at least a portion of which is magnetic in close proximity to an electro-magnetic induction coil system whereby the voltage induced by said system when said system is energized by a periodically changing electric current is measurably increased by the presence of the magnetic material within the field of said coil system and the increase in said induced voltage varies with the weight per unit of length of the magnetic material disposed within the field of said coil system. More specifically, my method for determining the density of flowing magnetic material consists in placing a pair of electro-magnetic induction coils around a flow line of moving magnetic material whereby said magnetic material forms a magnetic coupling between said coils and balancing out the induced signal produced when no magnetic material is flowing in said flow line to produce an output signal from the secondary coil which is directly proportional to the density of the magnetic coupling material.

My method for measuring by electro-magnetic induction the velocity at which magnetic material is moving, generally stated, consists in conveying moving material at least a portion of which is magnetic along a flow line disposed in close proximity to a pair of spaced electro-magnetic induction coils, producing a series of electric current pulses in the coil disposed behind the other coil relative to the direction of flow of magnetic material to magnetize a series of spaced increments in the magnetic material, detecting the magnetized increments by sensing the magnetic flux emanating therefrom in the second coil, measuring the time interval between the discharge of said pulses and the detection thereof to determine the velocity of the moving magnetic material. More specifically, my method for electro-magnetically measuring the velocity of moving magnetic material consists in conveying magnetic material through a pair of spaced coils, producing a series of electrical pulses in the coil disposed behind the other coil to magnetize a series of spaced increments in the flowing magnetic material, detecting the magnetized increments by sensing the flux emanating therefrom to induce a voltage in the second coil, amplifying the induced voltage picked up by said second coil, differentiating said amplified signal and controlling the firing of a thyratron tube by said differentiated signal to vary the rate at which the electrical pulses are produced whereby the frequency of said pulses is proportional to the velocity of the moving magnetic material.

The method of determining the mass rate of flow of moving magnetic material, generally stated, consists in measuring the density of magnetic material and producing an electrical signal proportional thereto, measuring the velocity of the moving magnetic material and producing a velocity indicating signal which constitutes a series of electrical pulses, the frequency of which is proportional to the velocity of the moving material, and multiplying said two signals together to produce a mass rate of flow indicating signal adapted to be used for control purposes. More specifically, the method of determining the mass rate of flow of moving magnetic material consists in measuring the velocity of moving magnetic material and producing a velocity indicating signal consisting in a series of electrical pulses, the frequency of which is proportional to said material velocity. In system F, this is done electro-magnetically, and in system G by an electro-mechanical arrangement. The density of the moving magnetic material is then measured by an electro-magnetic induction coil system in which the presence of the magnetic material in the field of said coil system measurably increases the voltage output thereof, balancing out the voltage output signal inductively produced by said coil system when no magnetic material is present in the field thereof to produce a density indicating signal proportional to the density of the moving magnetic material and multiplying said two signals together by initially producing a voltage differential between the plate and cathode of the thyratron control tube 64 which voltage differential is equal to the density indicating signal as charged on condenser 66 and said velocity indicating pulses controlling the conductivity of the tube 64 to charge condenser 69 with a charge proportional to the density indicating signal, which condenser 69 discharges through resistance 63 and the pulsating voltage thus produced is smoothed out by the filter network 71 and is adapted to be used for control purposes.

The method of controlling the feeding of material responsive to the mass rate of flow of magnetic material which, generally stated, consists in measuring the mass rate of flow of magnetic material by electro magnetic induction to produce a mass rate of flow indicating signal, connecting said mass rate of flow output signal with a conveyor driving mechanism to vary the rate of discharge of said mechanism. The feeding of the raw magnetic ore material into the concentrating plate is controlled by the magnetic content of the ore being conveyed and subsequently the feeding of combustible material into the concentrated ore is controlled by the rate of flow of the magnetic material toward the heating furnace.

It will be seen that I have provided a highly accurate, relatively flexible method and apparatus for controlling the feeding of material responsive to the mass rate of flow of magnetic material by electro-magnetically measuring the density of flowing magnetic material, determining the velocity at which said magnetic material is flowing either by a mechanical electrical arrangement by an electro magnetic induction system, combining the signals produced by the density measuring and velocity measuring systems to produce a rate of flow signal and controlling the feeding of both magnetic and non-magnetic material by the mass rate of flow signal thus produced.

It will, of course, be understood that various changes may be made in the form, details, arrangement and proportions of the parts without departing from the scope of my invention which, generally stated, consists in the matter shown and described herein and set forth in the appended claims.

What is claimed is:

1. Apparatus for producing a signal in proportion to the mass rate of flow of moving magnetic material having in combination, conveying means for carrying along a flow line material at least a portion of which is magnetic, a density measuring device comprising an electro-magnetic induction coil system so positioned with respect to said conveying means that the moving magnetic material forms a magnetic inductance increasing medium therein to produce a signal proportional to the density of the magnetic material moving along said conveying means, first circuit means including a condenser connected to said coil system to be energized thereby, a velocity measuring system comprising a magnetizing coil positioned in proximity with the moving magnetic material, means for periodically energizing said magnetizing coil such that an increment of said magnetic material is magnetized, a detecting coil positioned in proximity with said conveying means and spaced a predetermined distance from said magnetizing coil in the direction of movement of said magnetic material, said detecting coil having a voltage induced therein from the magnetic flux emanating from the magnetized increment, second circuit means connecting said detecting coil to said periodic energizing means such that the induced voltage of the detector coil controls the operation of the periodic energizing means, third circuit means connected to said periodic energizing means and energized in proportion to the frequency of operation of the same, and means connected to, and energized by, the first and third circuit means for producing a mass rate of flow signal adapted to be used for controlling purposes.

2. Apparatus for producing a signal in proportion to the mass rate of flow of moving magnetic material having in combination, conveying means for carrying along a flow line material at least a portion of which is magnetic, a density measuring system comprising a pair of coils so positioned with respect to said conveying means that the moving magnetic material forms a magnetic coupling between said coils, one of said coils being energized with an oscillating type of electric current and the othter of said coils having a signal induced therein in proportion to the density of the magnetic material moving along said conveying means, a first circuit means including a condenser connected to said second mentioned coil to be energized thereby, a velocity measuring system comprising a magnetizing coil positioned in proximity with the moving magnetic material, means for periodically energizing said magnetizing coil such that an increment of said magnetic material is magnetized, a detecting coil positioned in proximity with said conveying means and spaced a predetermined distance from said magnetizing coil in the direction of movement of said magnetic material, said detecting coil having a voltage induced therein from the magnetic flux emanating from the magnetized increment, second circuit means connecting said detecting coil to said periodic energizing means such that the induced voltage of the detector coil controls the operation of the periodic energizing means, third circuit means connected to said periodic energizing means and energized in proportion to the frequency of operation of the same, and means connected to and energized by said first and third circuit means for producing a mass rate of flow signal adapted to be used for control purposes.

3. Apparatus for producing a signal in proportion to the mass rate of flow of moving magnetic material having in combination conveying means for carrying along a flow line material at least a portion of which is magnetic, a density measuring system comprising a pair of coils so positioned with respect to said conveying means that the moving magnetic material forms a magnetic coupling between said coils, one of said coils being energized with an oscillating type of electric current and the other of said coils having a signal induced therein in proportion to the density of the magnetic material moving along said conveying means, a first circuit means including a condenser connected to said second mentioned coil to be energized thereby, a velocity measuring system comprising a magnetizing coil positioned in proximity with the moving magnetic material, means for periodically energizing said magnetizing coil such that an increment of said magnetic material is magnetized, a detecting coil positioned in proximity with said conveying means and paced a predetermined distance from said magnetizing coil in the direction of movement of said magnetic material, said detecting coil having a voltage induced therein from the magnetic flux emanating from the magnetized increment, second circuit means connecting said detecting coil to said periodic energizing means such that the induced voltage of the detector coil controls the operation of the periodic energizing means, third circuit means connected to said periodic energizing means and energized in proportion to the frequency of operation of the same, an electron tube means including a plate, a grid and a cathode, said first circuit means being connected to and energizing said plate, said third circuit means being connected to the grid of said tube, and impedance means connected to said plate and said cathode and having a signal produced therein when said tube becomes conductive, said signal being proportional to the mass rate of flow of said material and being adapted for use for control purposes.

4. Apparatus for producing a signal in proportion to the mass rate of flow of moving magnetic material having in combination, conveying means for carrying along a flow line material at least a portion of which is magnetic, a density measuring system positioned in close proximity to said conveying means and constructed to produce a signal proportional to the density of magnetic material carried along said flow line by said conveying means, first circuit means including a condenser connected to said density measuring system to be energized by the signal produced thereby, a velocity measuring system associated with said conveying means and constructed to produce a series of electrical pulses, the frequency of which is responsive to the velocity of flow in said flow line, another circuit means connected to said velocity measuring system and energized in proportion to the frequency of the signal produced thereby, a multiplier section comprising an electron tube means including a plate, a grid and a cathode, said first circuit means being connected to, and energizing, said plate, said second mentioned circuit means being connected to the grid of said tube and firing the same upon being energized by the pulses produced by said velocity measuring system, and impedance means connected to said plate and said cathode and having a signal produced therein when said tube fires, said signal being proportional to the mass rate of flow of the material in said flow line and being adapted to be used for control purposes.

5. Apparatus for measuring the mass rate of flow of material, at least a portion of which is magnetic, said apparatus having in combination a density measuring system comprising electro-magnetic induction equipment including a periodically changing current imposed therein to produce a changing magnetic field through which magnetic material is adapted to flow, whereby said magnetic material serves as a magnetic coupling device and induces a density indicating signal proportional to the density of said magnetic material, a velocity measuring system comprising a pair of spaced-apart annular electromagnetic induction coils surrounding the flowing magnetic material, one of said coils constituting a magnetizing coil, the other constituting a detecting coil disposed a predetermined distance in the direction of flow of the magnetic material from said magnetizing coil, periodic energizing means connected to said magnetizing coil to magnetize an increment of magnetic material flowing through the open central area of said annular coil, said annular detecting coil having a voltage induced therein by the magnetic flux emanating from the magnetized increment passing therethrough, an electrical system connected with said coils for converting to a velocity indicating signal the time interval from the occurrence of the magnetizing pulse from the periodic energizing means to the induction of the detection pulse in the detecting coil, and an electronic multiplier section connected with the velocity indicating control system and the density indicating control signal for multiplying the two signals, the output of which is proportional to the mass rate of flow of magnetic material.

6. Apparatus for producing a control signal in proportion to the mass rate of flow of magnetic material, said apparatus comprising conveying means for carrying material at least a portion of which is magnetic, a density measuring device comprising an electro-magnetic induction coil system so positioned with respect to said conveying means that the moving magnetic material forms a magnetic induction-increasing medium therein to produce a signal proportional to the density of the magnetic material moving along said conveying means, and electrical pulse-producing velocity measuring system associated with said conveying means and including a magnetizing coil for successively magnetizing spaced increments in the flowing magnetic material and including a pulse detecting coil spaced from the magnetizing coil in the direction of flow of the magnetic material having induced therein by said spaced magnetic increments a pulsating electrical current, electrical circuit means connected with said detecting coil to receive said pulsating current induced therein and produce a signal which is a function of the velocity of the flowing magnetic material, and means connected to said velocity measuring system to receive the velocity indicating signal therefrom and connected with the density indicating system to receive the density indicating signal therefrom and constructed to combine said two signals to produce a mass rate of flow signal adapted to be used for controlling purposes.

7. The structure set forth in claim 6, and said means for combining said two signals comprising an electronic multiplier section wherein said velocity indicating signal is electronically integrated with said density indicating signal to produce a signal which is a function of the mass rate of flow of the flowing magnetic material.

8. Apparatus for measuring the velocity of moving magnetic material, said apparatus comprising conveying means for carrying in a flow line sub-divided material at least a portion of which is magnetic, a magnetizing coil associated with said conveying means, a pulse generator connected to said magnetizing coil for producing pulsed energization thereof in a manner such that said coil magnetizes an increment of the magnetic material being conveyed, a detecting coil associated with said conveying means and spaced a predetermined distance from the magnetizing coil in the direction of flow of the moving magnetic material, said detecting coil having a pulse of current induced therein by each magnetized increment passing in close association to said detecting coil, coupling circuit means interconnecting said detecting coil and said pulse generator to conduct said induced pulse to the said pulse generator, said pulse generator adapted to generate a pulse of current to energize said magnetizing coil whenever an induced pulse is received thereby, a pulse initiating oscillator adapted to produce pulses of voltage, coupling circuit means interconnecting said oscillator with a portion of said pulse generator circuit and adapted to transmit said voltage pulse to said pulse generator circuit to conduct and energize said magnetizing coil, circuit means interconnecting said oscillator and said detecting coil arranged to render said pulse initiating oscillator ineffective to initiate additional pulses as long as the pulses produced by said pulse generator are picked up by said detecting coils and initiating new pulses in said pulse generator whenever said detector coil fails to have a pulse of current induced therein by a magnetized increment from said flowing magnetic material.

9. In the art of feeding moving materials, at least a portion of which is magnetic, in predetermined proportions, the method steps consisting in electromagnetically producing and electronically combining a density indicating signal and a velocity indicating signal to produce a control signal proportional to the mass rate of flow of magnetic material, controlling the rate of flow of said moving materials in accordance with said mass rate of flow signal to produce a predetermined proportion of the mass rate of flow of the magnetic material to the other material.

10. In the art of feeding different moving materials, one of which is a magnetic material, in predetermined proportions for mixing, the method steps consisting in producing a first signal proportional to the density of the moving magnetic material by electromagnetically detecting magnetic coupling characteristics of the magnetic material, producing a second signal proportional to the velocity of flow of the moving magnetic material by electromagnetically inducing magnetic fields in increments of flowing material and timing travel of such increments through a predetermined distance, integrating said first and second signals to produce a control indication proportional to the mass rate of flow of magnetic material, controlling the relative flow rates of the materials in accordance with said control indication whereby to maintain predetermined proportions of the materials.

11. In the art of feeding for mixing magnetic and other material in predetermined proportions, the method consisting in conveying said materials in confined flow from one location to another, electromagnetically producing a determinant proportional to the mass rate of flow of magnetic material by magnetizing increments of flowing magnetic material and detecting magnetic coupling characteristics and rate of movement thereof, and controlling relative rates of flow of the materials in accordance with changes in said determinant.

12. Apparatus for producing a controlled signal in proportion to the mass rate of flow of magnetic material, said apparatus comprising conveying means for carrying material at least a portion of which is magnetic, a density measuring device comprising an electromagnetic induction coil system so positioned with respect to said conveying means that the moving magnetic material forms a magnetic induction-increasing medium therein to produce a signal proportional to the density of the magnetic material moving along said conveying means, a velocity measuring device including an electric pulse generator and including a magnetizing coil magnetically coupled with the flowing magnetic material and being connected with said pulse generator for successively magnetizing spaced increments in the flowing magnetic material, said velocity measuring device also including a pulse detecting coil spaced from the magnetizing coil in the direction of flow of the magnetic material, said pulse detecting coil being magnetically coupled with the flowing magnetic material and having induced therein by said spaced magnetic increments a pulsing electrical current, and electric current integrating means having a first input coupled with said generator and with said detector coil for receiving generated and detected pulse electric pulses therefrom, said integrating means also having a second inlet coupled with said density measuring device, said integrating means being constructed and arranged to respond to time elapsed between the reception of a generated pulse and a detected pulse from said generator and said detector coil respectively and to also respond to the output signal of said density measuring device, whereby to produce a controlled signal which is proportional to the mass rate of flow of magnetic materials.

13. Apparatus for measuring, in confined and turbulently flowing fluid, the velocity of flow of solid magnetic material heterogeneously carried in the fluid, comprising a pair of induction coils encircling the confined flowing fluid, one of said coils comprising a magnetizing coil and the other of said coils comprising a detecting coil, said detecting coil being spaced a predetermined distance from said magnetizing coil in the direction of fluid flow, an electric pulse generator coupled with said magnetizing coil and being constructed and arranged for producing intermittent electric pulses whereby to intermittently create magnetizing fields in said magnetizing coil to produce spaced increments of magnetized material which induce intermittent pulses in said detecting coil, and time responsive electric control means connected in controlled relation with said generator and with said detecting coil for receiving electric pulses therefrom, said electric control means being constructed and arranged for producing a control signal in response to the time interval from generation of a magnetizing pulse by said generator to detection of the pulse by said detector coil, whereby said control signal is proportional to velocity of flow of said magnetic material.

14. Apparatus for determining in heterogeneous material moving along a flow line, the density of the magnetic material non-uniformly dispersed throughout the heterogeneous materials, comprising an exciting coil encircling the flow line of materials to produce a high intensity magnetic field along a substantial length of the flow line, said coil being adapted to be energized by an oscillating-type electric current, a second coil also encircling said material flow line and positioned with respect to said exciting coil such that the magnetic portion of the heterogeneous material serves as a magnetic coupling device to aid magnetic flux generated by the exciting coil to thread said second coil and induce therein a signal in proportion to the density of the magnetic material.

(References on following page)

References Cited in the file of this patent

UNITED STATES PATENTS

| | | |
|---|---|---|
| 1,952,185 | Smith | Mar. 27, 1934 |
| 2,064,495 | Queneau | Dec. 15, 1936 |
| 2,082,539 | Fischer | June 1, 1937 |
| 2,331,418 | Nolde | Oct. 12, 1943 |
| 2,405,137 | Gale et al. | Aug. 6, 1946 |
| 2,409,707 | Roetheli | Oct. 22, 1946 |
| 2,435,043 | Lehde et al. | Jan. 27, 1948 |
| 2,548,876 | De Jahn | Apr. 17, 1951 |
| 2,603,688 | Cole et al. | July 15, 1952 |
| 2,607,223 | Fleming | Aug. 19, 1952 |

OTHER REFERENCES

Perry: Chemical Engineers Handbook, published by McGraw-Hill Book Co. Inc., New York, 3rd ed., 1950, pages 1292–1295.